(12) United States Patent
Yerazunis et al.

(10) Patent No.: US 6,650,306 B2
(45) Date of Patent: Nov. 18, 2003

(54) SECURITY-ENHANCED DISPLAY DEVICE

(75) Inventors: William S. Yerazunis, Acton, MA (US); Darren L. Leigh, Belmont, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 129 days.

(21) Appl. No.: 09/923,160

(22) Filed: Aug. 6, 2001

(65) Prior Publication Data
US 2003/0025667 A1 Feb. 6, 2003

(51) Int. Cl.[7] .......................... G09G 5/00; H04N 13/04; G02B 27/28
(52) U.S. Cl. .................. 345/8; 345/7; 348/56; 348/57; 348/58; 359/501
(58) Field of Search ................. 345/7–8, 102; 348/53–60; 359/460, 464, 501; 349/62, 64, 96, 99

(56) References Cited

U.S. PATENT DOCUMENTS

| | | | | |
|---|---|---|---|---|
| 4,859,994 A | * | 8/1989 | Zola et al. ................. 345/9 |
| 4,870,486 A | * | 9/1989 | Nakagawa et al. ......... 348/58 |
| 4,879,603 A | * | 11/1989 | Berman ................. 348/832 |
| 4,967,268 A | | 10/1990 | Lipton et al. ............. 358/92 |
| 5,117,302 A | | 5/1992 | Lipton ................... 359/227 |
| 5,181,133 A | | 1/1993 | Lipton .................... 359/84 |
| 5,327,153 A | * | 7/1994 | Biverot ..................... 345/5 |
| 5,343,313 A | * | 8/1994 | Fergason ................. 349/11 |
| 5,347,378 A | * | 9/1994 | Handschy et al. ......... 349/78 |
| 5,422,756 A | | 6/1995 | Weber ................... 359/487 |
| 5,463,428 A | | 10/1995 | Lipton et al. ............ 351/158 |
| 5,479,187 A | * | 12/1995 | Chen ..................... 345/102 |
| 5,528,319 A | | 6/1996 | Austin ................... 348/835 |
| 5,583,674 A | * | 12/1996 | Mosley ................... 349/77 |
| 5,629,984 A | | 5/1997 | McManis ................. 380/54 |
| 5,717,412 A | | 2/1998 | Edwards .................. 345/7 |
| 5,973,760 A | * | 10/1999 | Dehmlow ............... 349/102 |
| 6,061,489 A | * | 5/2000 | Ezra et al. .............. 385/115 |
| 6,078,374 A | * | 6/2000 | Sharp et al. ............ 349/119 |
| 6,280,034 B1 | * | 8/2001 | Brennesholtz ............ 353/20 |
| 6,456,432 B1 | * | 9/2002 | Lazzaro et al. .......... 359/464 |

OTHER PUBLICATIONS

InvisiView Technologies. www.man-machine.com/invisivw.html. Jul. 19, 2001.
Alfred Poor, "InvisiView Makes your Notebook Snoop-Proof"; PC Magazine Online, Jul. 19, 2001.

* cited by examiner

*Primary Examiner*—Richard Hjerpe
*Assistant Examiner*—Duc Q Dinh
(74) *Attorney, Agent, or Firm*—Dirk Brinkman; Andrew Curtin

(57) ABSTRACT

A device for displaying images only to an authorized user includes a display device configured to display the images. The display device includes a backlight for generating incident light of mixed polarization, a first polarization rotator, and a first polarizer disposed between the backlight and the first polarization rotator. An optical shutter device is configured to view the displayed images. The optical shutter device includes a second polarization rotator and a second polarizer. The first and second polarization rotators are synchronously rotated while displaying the images so that the image are only perceived by the authorized user viewing the display device through the optical shutter device.

7 Claims, 4 Drawing Sheets

SECURITY-ENHANCED DISPLAY DEVICE

FIELD OF THE INVENTION

The present invention relates generally to the field of data security, and more particularity to displaying secure data on display devices in public locations.

BACKGROUND OF THE INVENTION

With the advent of desktop and portable computer systems, the problem of maintaining the confidentiality of secure data is increased. This is a particular problem for laptop computers and hand-held personal digital assistants (PDAs) that are frequently used in public locations. Data security is also a problem for other display systems, such as automated teller machines, and Internet terminals in public locations, such as Internet shops and airports.

In recent years, a great deal of effort has been expended on making flat panel display screens as readable as CRT screens by using active matrix technology. However, enhanced readability of displayed data increases the risk of confidential information being viewable by unauthorized persons when portable displays are used in public locations.

One solution is to provide the display with physical "blinders" mounted on the side of the display to limit the angle at which the display can be seen. Another type of mechanical solution uses microscopic louvers to obscure the screen to any viewer not along the axis of the louvers. However, this does not prevent viewing by a person sitting directly behind the user of the display. In addition, this type of arrangement does not allow the user to leave the equipment unattended.

One manufacturer, InvisiView Technologies, Inc., Boca Raton, Fla., removes the front polarizer from a LCD type of device so the displayed image is no longer visible. If the display is viewed through polarized lenses, it becomes visible. This is a partial solution because anyone wearing consumer-grade polarized sunglasses can defeat the system.

U.S. Pat. No. 5,528,319 "Privacy filter for a display device" issued to Austin on Jun. 18, 1996 describes a privacy filter constructed of spaced-apart opaque grids that can be fitted to a display device. The problems with this arrangement is that it requires physical modification of the device, and like the blinders above, only limits the angle at which the display can be viewed.

U.S. Pat. No. 5,629,984 "System and method for data security" issued to McManis on May 13, 1997 describes a display system that alternates data frames with flash frames where an overwhelming majority of pixels are illuminated so that the flash frames have an average intensity substantially greater than the data frames. The user views the display with a shutter device that is synchronized to the displayed frames. The shutter is open for the data frames, and closed for the flash frames. The interspersed flash frames are intended to make it difficult for a viewer without the optical shutter device to intelligibly read the data frames.

The problem with this system is that most people can perceive images even is the relative intensity of darkest elements is only about 1/100 that of the brightest elements. In other words, the intensity of the flash frames would have to be increased by at least 20 db in order for the device to be effective. In a practical LCD applications, the display elements are usually driven at full power to maximize brightness. Therefore, it is problematic whether the driving voltage can be increased by a factor of a hundred. Even if the flash frames can be displayed, it is well known that over illuminating the display screen greatly shortens its useable life-span. In addition, the flash frames would attract attention to bystanders, and the device is more susceptible to counter attacks.

SUMMARY OF THE INVENTION

The invention provides a device for displaying images only to an authorized user includes a display device configured to display the images. The display device includes a backlight for generating incident light of mixed polarization, a first polarization rotator, and a first polarizer disposed between the backlight and the first polarization rotator. An optical shutter device is configured to view the displayed images. The optical shutter device includes a second polarization rotator and a second polarizer. The first and second polarization rotators are synchronously rotated while displaying the images so that the image are only perceived by the authorized user viewing the display device through the optical shutter device.

DETAILED DESCRIPTION OF THE PREFERRED EMBODIMENT

System Overview

Movies, televisions and computerized display devices normally display frames at a predetermined frame rate, e.g., twenty-four per second or higher. Persistence in the human visual system causes the rapidly displayed frames to merge into a continuous image. In the present invention, this persistence is used to enable privacy-enhanced display devices.

Figure 1:
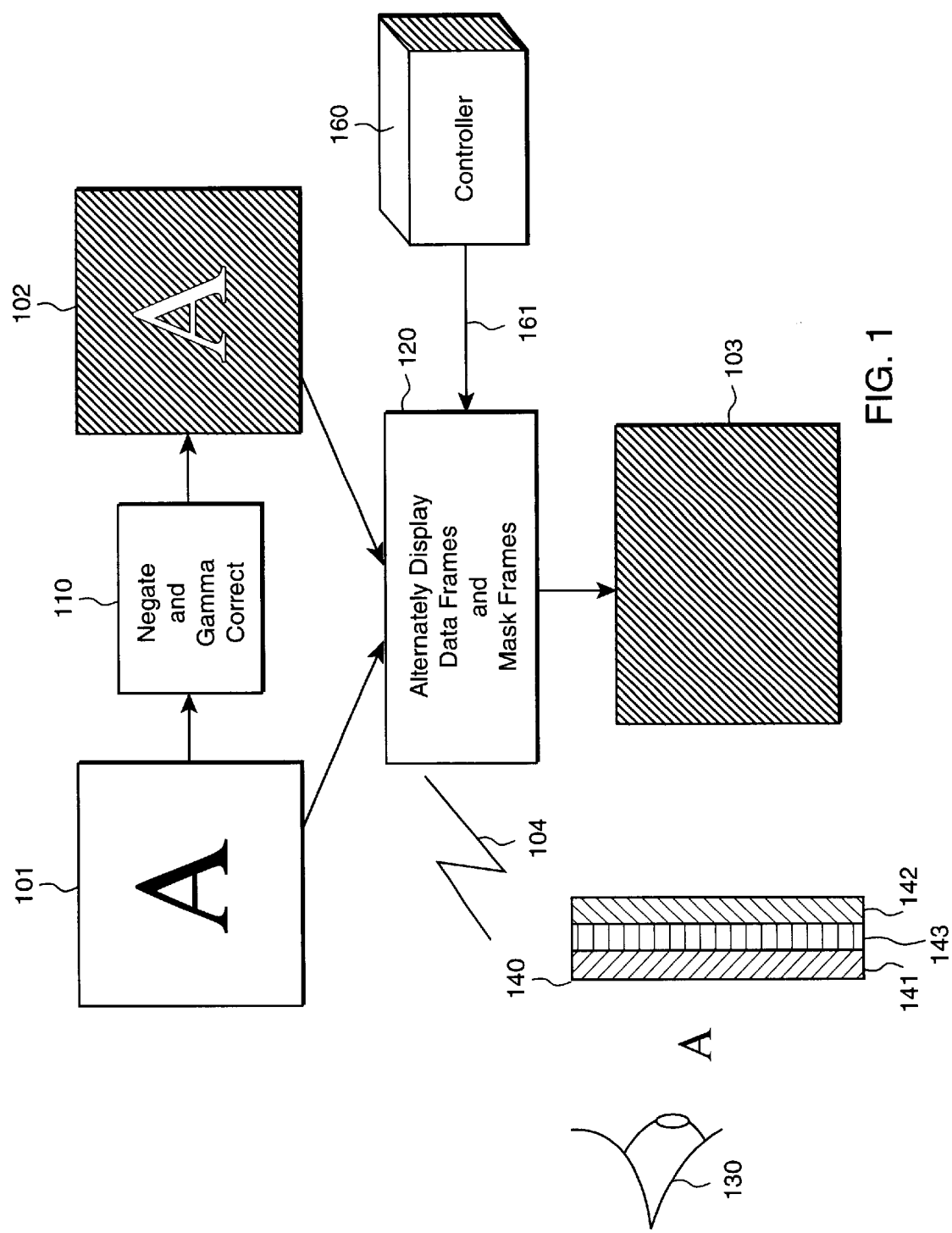
FIG. 1 is flow diagram of a privacy enhanced display system according to the invention.

As shown in FIG. 1, input to the system is a data frame 101, or perhaps a sequence of data frames as in a video. Each data frame, in sequential order, is negated 110 to produce a mask (reverse) frame 102. The negation can be done by an inverter. A display device 120 than selectively displays either the data frame or the mask frame 102. The selection is done according to a select signal 161 generated by a controller 160. In one embodiment, the controller 160 produces a clock signal that alternatively selects either the data frame or the negative frame.

The net result is a featureless neutral "gray" image 103 because the overall perceived intensity of the image is half-way between sum of the intensities of the data and mask frames. Thus, privacy of the displayed information is preserved. It should be understood that frames of a video can be similarly be processed in sequence.

A user 130 perceives only the data frames 101 by viewing the neutral images 103 through a shutter device 140 that is synchronized 104 in phase and frequency to the frame rate of the display device 120. Frequency synchronization can be done internally to the optical shutter device 140. The optical shutter device 140 is open for the data frames 101 and closed for the mask frames 102 so that only the phase needs to be synchronized.

One type of shutter device can use modified Crystal-Eyes™ eyewear manufactured by StereoGraphics Corporation of San Rafael, Calif. and described in U.S. Pat. Nos. 4,4967268, 5,117,302, 5,181,133, and 5,463,428 incorporated herein by reference. The unmodified glasses operate the left and right lenses sequentially for stereoscopic viewing, the modified lenses operate in parallel.

However, nematic liquid-crystal stereographic shutter glasses are typically limited to an operating frequency of 60 Hz, or less. This leads to noticeable flickering in the perceived image. Therefore, our shutter device 140 includes polarizing lenses 141–142 on either side of a ferro-electric liquid crystal (FLC) polarization rotator 143. The FLC rotator can switch polarization rotation from $+\pi/4$ to $-\pi pi/4$ at a frequency up to about 100 KHz, when driven by a bipolar $\pm 5.0$ volt control line 144 to take advantage of faster displays.

Wire or wireless, e.g., infra-red, communication can be used to synchronize to the phase of the display device 120. This allows the display device according to the invention to be used concurrently by multiple users in a public location without requiring a physical link between the users and the display device.

For safety and ease-of-use reasons, the optical shutter device 140 operates continuously while worn by the user so that the user's environment remains visible even if the user is not in range of the display unit. Thus, the synchronization signal 104 only needs to control the phase, and not the frequency or amplitude, of the select signal 161.

If the data frames 101 are binary or two-tone image, then a negation simply means turning all white components of the data frames, e.g., pixels with zero or off values, to black components in the negative frames, e.g. pixels with one or on values. If the data frame use a gray scale, then the negation simply subtracts the pixel values of the data frames from the maximum pixel value, i.e., 255 for an eight bit pixel value.

Although a primary use of the invention is with portable display devices, it should be noted that the display system as described above can use any number of illumination techniques including CRT, LCD, LED, laser, digital projector—rear- or front, large or small, and so forth.

Color Display

In the case of color images, the negation is performed independently on each of the color channels, e.g., red, green, and blue for a "RGB" display system. Thus, for a system that display each of red, green, and blue at 256 levels, such as commonly available 24-bit (3×8) color mode display devices, each pixel of the red negative frame is displayed at a value of 255 minus the corresponding red data frame pixel value. Similarly, the values for the green and blue channels are determined.

The intensity of the light generated by most display devices is usually not a linear function of the applied signal. A conventional CRT has a power-law response to voltage. Therefore, the intensity of the light produced at the face of the screen of the display is approximately the applied voltage, raised to the 2.2 power. The numerical value of the exponent of this power function is colloquially known as gamma ($\gamma$). This non-linearity must be compensated for in the negated frames.

To do this correction for a typical CRT type of display device, the input pixel values from 0 to 255, after negation, are remapped to output pixel values according to $$\text{output}=255((\text{input}/255)^{1/\gamma})+0.5$$

where $\gamma$ is obtained from the display device CRT manufacturer's specifications.

Secure Display

Figure 2:
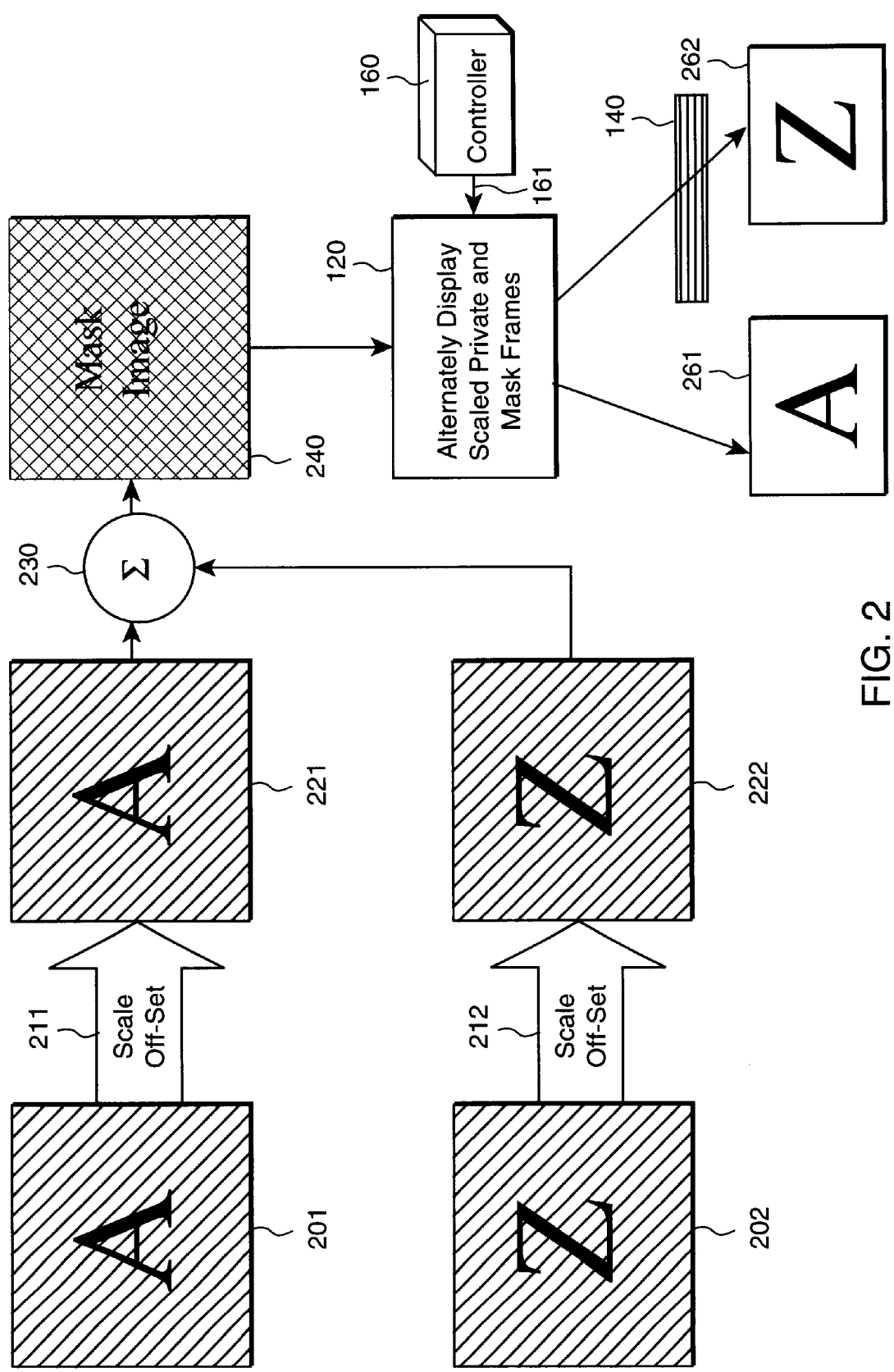
FIG. 2 is a flow diagram of a secure display according to the invention.

FIG. 2 shows an alternative embodiment the input is a public image 201 and a secret image 102. The intensity values of the images 201–202 are respectively scaled and off-set 211–212 to produce a scaled public image A 221 and a scaled secret image Z 222. For every pixel $p_p$ in the public image 201, $\alpha p_p + A$, and the secret pixels are $\beta p_s + B$. The scaled images 221–222 are then combined 230 to produce a mask image 240. The mask image 240 and scaled secret image 222 are then displayed 120 according to the select signal 161 produced by the controller 160, as described above. The result is that without the optical shutter device 140, the perceived image 261 is the scaled public image 221. However, when the display device 120 is viewed through the optical shutter device 140, the perceived image 262 is the scaled secret image 222.

The scaling and off-setting are such that the intensity values of the mask image 240 are within the dynamic range of the display device. If the normalized dynamic range of the display device is 0 to 1, and the respective scaling factors are $\alpha$ and $\beta$, and the off-sets A and B, then $\alpha + \beta \leq 1$, and $\alpha + A \leq B$. These inequalities constrain the respective dynamic ranges of the perceived public image 261 and the perceived secret images 262. A high-dynamic-range public image forces a low-dynamic-range, dim perceived secret image, and vice versa. If $\alpha = \beta$, and $A = 0.0$ and $B = 0.5$, the perceived public and secret images will be of equal quality. The perceived public image will lower in contrast with an elevated black level, and the perceived secret image will be dimmer, but still within a brightness range for acceptable viewing.

Coded Display

The above described display devices provide a reasonable level of privacy for the casual user. However, because the displayed images alternate at a constant frequency, e.g., 60 Hz, the system is still open to attack by a persistent snooper. By scanning through the frequency range, a snooper could determined the frequency of the alternating display.

Figure 3:
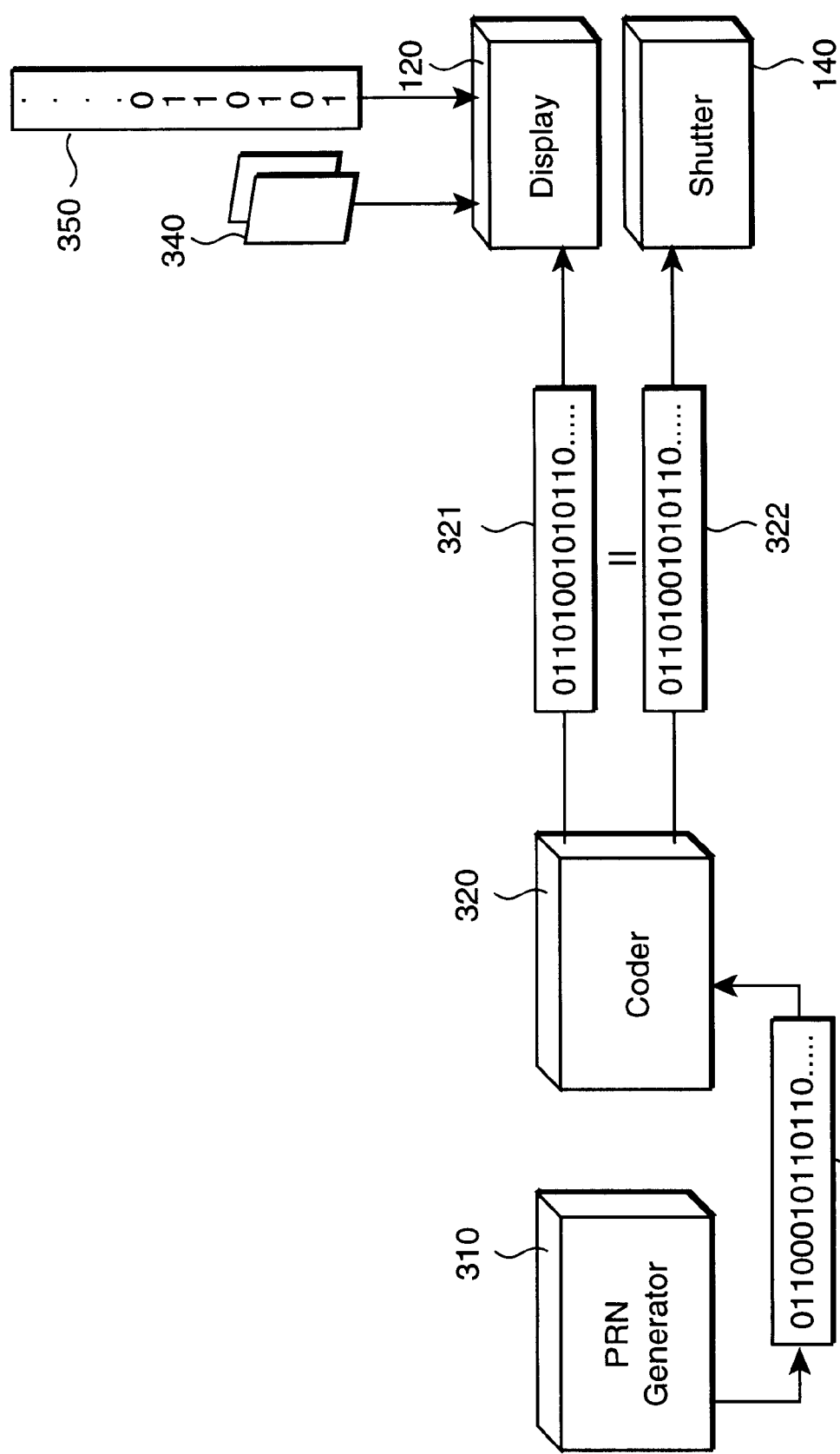
FIG. 3 is a flow diagram of an encoded display according to the invention.

FIG. 3 shows an embodiment where a pseudo random (PR) generator 310 is used to generate a pseudo random sequence of zero and one bits 311. The random sequence can be produced by a hash function that uses a seed value, half of which is stored internally, and the other half is supplied in real-time, perhaps at the frame rate. The PR generator 310 can be incorporated into the controller 160 instead of a constant frequency clock.

In the case of a wireless interconnection, two pseudo-random generators can be used. Each is initialized to the same state and so will produce the same random sequence. One sequence is used in the display device, and the other in the optical shutter device. Synchronization between the sequences can be done as described above.

A coder 320 converts each zero bit to a pair of select signals [0,1], and each one bit to a pair of select signals [1,0]. The resulting coding sequences 321–322 are fed, in parallel, to the display device 120 and a shutter device 140 to perform the appropriate selection of the order of displayed images. Note, the pairs in the select signals 321 and 322 ensure that each successive pair of input frames 340 will alternate, so the perceived effect will be as above, with the added advantage that it is impossible for a snooper to determine the random sequence 311, without direct access to the equipment.

Serial Coding

So far, we have assumed that pixels are displayed and perceived in a parallel manner. This is effectively true for most LCD and CRT devices. Even though the pixels are initially generated in a serial beam and displayed in a raster scan order on a CRT, the relatively long decay time of the physical display elements, e.g., phosphor dots, parallelizes the perceived illumination. Consequently, the optical shutter device can operates at the frame rate of the display device.

For a device where the pixels can truly be displayed in a serial manner, e.g., LEDs, FLCs, or laser displays, we can modify the above encoding technique to further enhance the security of the displayed images.

In this embodiment, the input image is in the form of a serial stream of pixel values 350, e.g., zeroes and ones for a binary image or byte values for gray-scale and color images. Now, we modulate the pixels and shutter on a per pixel basis. For every zero value in the coding sequence 321 we display the correct pixel value, and for every one bit in the coding sequence, we negate the pixel value, as described above with reference to FIG. 1. Similarly, the opening and closing of the optical shutter device 140 is on a pixel basis, with the optical shutters closed for negated pixel values. Thus, some one viewing the display synchronized to the frame rate of the images will still only perceive a gray image.

LCD Display

Figure 4:
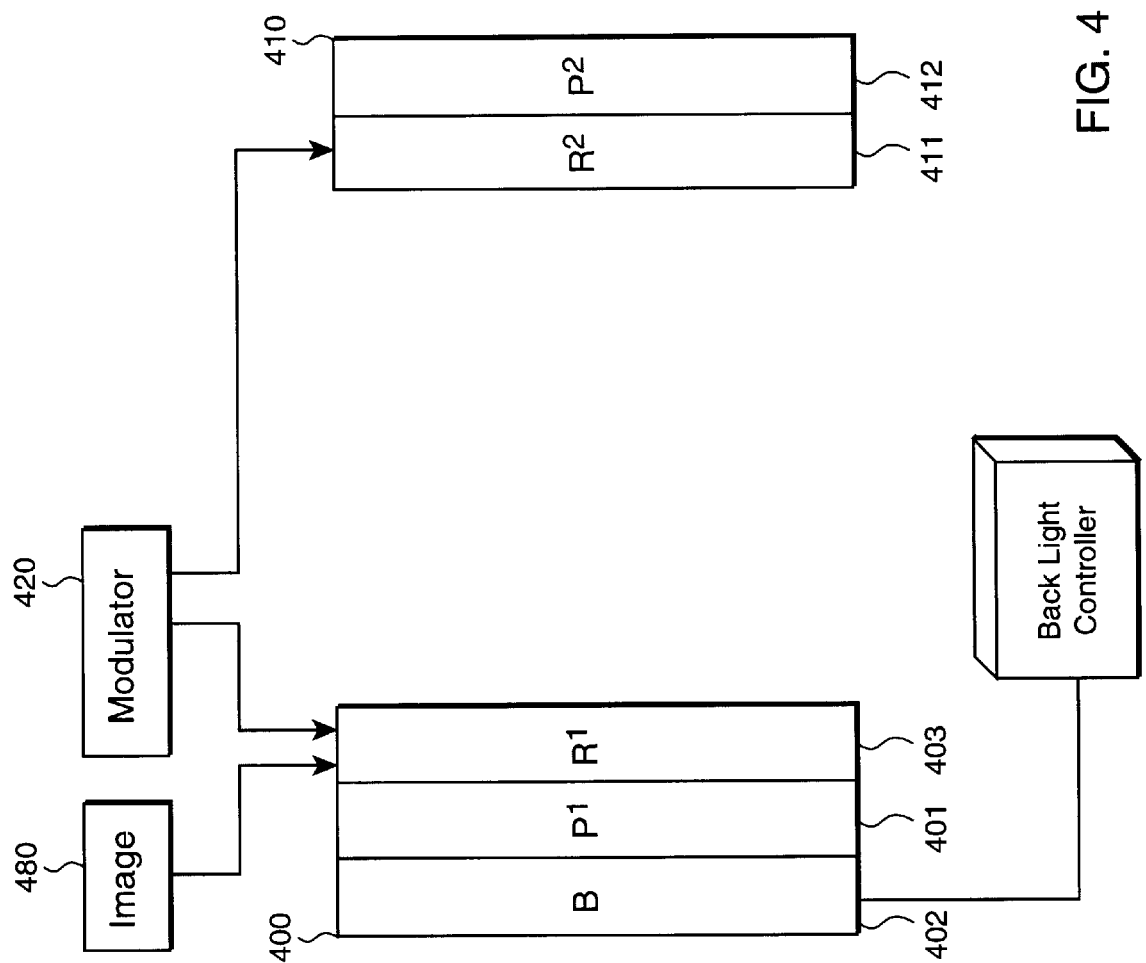
FIG. 4 is a flow diagram of an alternative embodiment of a secure display system.

In the case where the display device 120 uses a low-power liquid crystal display (LCD), such as used with many portable display systems, other security embodiments are possible, as shown in FIG. 4. These embodiments are for the following reasons. First, a LCD cannot change state as quickly as CRT type of display devices, therefore perceived persistence may be an issue. Second, LCDs are generally low-power, aggravating the degradation of the perceived images. Therefore, our LCD 400 is constructed as follows. A first polarizer ($P^1$) 401 is disposes between a backlight (B) 402 and a first optical rotator element ($R^1$) 430. By a polarizer, we mean a lens that rotates the polarization of visible light. The backlight is a source of incident light of mixed polarization. Note, we omit the customary other polarizer found in conventional LCDs. In this embodiment, the optical shutter device 410 includes a second optical polarization rotator element ($R^2$) 411 and a second polarizer ($P^2$) 412. An input image 400 is displayed while the first and second polarization rotators are modulated 420 by angle of polarization. The modulation can be regular or random as described above.

If the images are viewed directly by the unaided eye, they appears uniformly white. If the image is viewed through standard stationary polarizing lenses, as in the prior art InvisiView device, they are still unreadable. However, when the images are viewed through the optical shutter device 410 modulating the polarization rotators of the display device and the shutter device synchronously, the images become visible.

The modulation of the polarization rotators can be done adding ±45° off-set to the normal polarization modulation. This can be done by biasing the overall screen voltage, because in the LCD, the amount of rotation is substantially linearly proportional to the driving voltage. As described above, the modulation of the rotators can be done periodically or randomly, depending on the level of security desired.

Thus, areas of the image that appear bright in one polarization direction appear dark in a perpendicular direction, and these are reverse whenever the +45 to −45 degree rotational voltage modulation occurs. The result is as before, the screen appears a featureless gray to unauthorized viewers, even those wearing polarizing sunglasses. Only properly modulated shutter devices will make the image 400 visible.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. An apparatus for displaying images only to an authorized user, comprising:

a display device configured to display the images, the display device including a backlight for generating incident light of mixed polarization, a first polarization rotator, and a first polarizer disposed between the backlight and the first polarization rotator;

an optical shutter device configured to view the displayed images, the optical shutter device including a second polarization rotator and a second polarizer; and means for synchronously rotating the first and second polarization rotators while displaying the images so that the images are only perceived by the authorized user viewing the display device through the optical shutter device.

2. The apparatus of claim 1 wherein the first and second polarization rotators are rotated periodically.

3. The apparatus of claim 1 wherein the first and second polarization rotators are rotated randomly.

4. The apparatus of claim 1 wherein the first and second polarization rotators are rotated on a pixel by pixel basis.

5. The apparatus of claim 1 wherein the rotating is performed by adding a ±45° off-set to a normal polarization modulation of the first and second rotators.

6. The apparatus of claim 1 wherein no images are perceived by an unauthorized user viewing the display device directly.

7. The apparatus of claim 1 wherein no images are perceived by an unauthorized user viewing the display device through stationary polarizers.

* * * * *